US010243967B2

(12) United States Patent
Hu

(10) Patent No.: US 10,243,967 B2
(45) Date of Patent: Mar. 26, 2019

(54) METHOD, APPARATUS AND SYSTEM FOR DETECTING FRAUDULANT SOFTWARE PROMOTION

(71) Applicant: Alibaba Group Holding Limited, Grand Cayman (KY)

(72) Inventor: Yuxiang Hu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 162 days.

(21) Appl. No.: 15/251,034

(22) Filed: Aug. 30, 2016

(65) Prior Publication Data

US 2017/0063913 A1 Mar. 2, 2017

(30) Foreign Application Priority Data

Sep. 1, 2015 (CN) .......................... 2015 1 0555824

(51) Int. Cl.
*G06N 7/00* (2006.01)
*G06F 17/22* (2006.01)
(Continued)

(52) U.S. Cl.
CPC .......... *H04L 63/12* (2013.01); *G06F 17/2211* (2013.01); *G06F 21/51* (2013.01); *H04L 67/34* (2013.01); *G06N 7/005* (2013.01)

(58) Field of Classification Search
CPC ...... G06F 17/2211; G06F 21/51; G06F 21/55; H04L 63/12; H04L 67/34; G06N 7/005
See application file for complete search history.

(56) References Cited

U.S. PATENT DOCUMENTS 7,519,562 B1 *   4/2009   Vander Mey .......... G06Q 30/02
                                                      705/12
8,621,623 B1 *  12/2013   Yuksel ................... G06Q 10/10
                                                    707/999.005
(Continued)

OTHER PUBLICATIONS

Sandulescu, Vlad et al., "Detecting Singleton Review Spammers Using Semantic Similarity", WWW'15 Companion, May 18-22, 2015, Florence, Italy, 6 pages. (Year: 2015).*

(Continued)

*Primary Examiner* — Michael Pyzocha
(74) *Attorney, Agent, or Firm* — James J. DeCarlo; Greenberg Traurig, LLP

(57) ABSTRACT

A method, system and apparatus for detecting fraudulent promotion of a software application, the method including acquiring comment information associated with a software application, the comment information including one or more comments; calculating an average similarity or average information entropy of the comment information, wherein the average similarity is calculated based on a similarity between the one or more comments and wherein the average information entropy is calculated based on an information gain between the one or more comments; defining a determination threshold range for a category associated with the software application, wherein the determination threshold range is defined by a plurality of probability statistical distribution parameters based on average similarities or average information entropies of other applications associated with the category; and identifying the software application as fraudulent if the average similarity or average information entropy of the comment information is within the determination threshold range.

19 Claims, 9 Drawing Sheets

(51) Int. Cl.
*G06F 21/51* (2013.01)
*H04L 29/06* (2006.01)
*H04L 29/08* (2006.01)

(56) References Cited

U.S. PATENT DOCUMENTS

| | | | |
|---|---|---|---|
| 8,793,255 B1* | 7/2014 | Bilinski | G06F 17/30867 707/740 |
| 8,903,812 B1* | 12/2014 | Chen | G06F 17/30817 707/723 |
| 8,984,151 B1 | 3/2015 | Hsieh et al. | |
| 9,043,887 B2 | 5/2015 | McLachlan et al. | |
| 9,152,694 B1 | 10/2015 | Padidar et al. | |
| 9,152,790 B1 | 10/2015 | Glick et al. | |
| 2005/0144143 A1 | 6/2005 | Freiberg | |
| 2010/0332287 A1 | 12/2010 | Gates et al. | |
| 2012/0150860 A1* | 6/2012 | Bhamidipati | G06F 17/3071 707/740 |
| 2012/0173315 A1 | 7/2012 | Martini et al. | |
| 2014/0108451 A1 | 4/2014 | Lee et al. | |
| 2014/0156660 A1 | 6/2014 | Arbon et al. | |
| 2014/0172989 A1 | 6/2014 | Rubinstein et al. | |
| 2014/0230053 A1* | 8/2014 | Mote | G06Q 30/0282 726/22 |
| 2014/0236846 A1 | 8/2014 | Melika et al. | |
| 2014/0244803 A1 | 8/2014 | Kang et al. | |
| 2014/0258169 A1* | 9/2014 | Wong | G06Q 30/0282 705/347 |
| 2014/0279379 A1 | 9/2014 | Mandi et al. | |
| 2015/0006328 A1 | 1/2015 | Yoon et al. | |
| 2015/0169877 A1 | 6/2015 | Mahaffey et al. | |
| 2015/0220926 A1 | 8/2015 | McLachlan et al. | |
| 2016/0021174 A1 | 1/2016 | De Los Santos Vilchez et al. | |
| 2016/0253484 A1* | 9/2016 | Zhu | G06Q 30/0185 726/23 |
| 2016/0283497 A1* | 9/2016 | Singh | G06F 17/30705 |
| 2017/0034107 A1* | 2/2017 | Krishnaswamy | H04L 51/32 |

OTHER PUBLICATIONS

Mukherjee, Arjun et al., "Spotting Fake Reviewer Groups in Consumer Reviews", WWW 2012, Apr. 16-20, 2012, Lyon, France, 10 pages. (Year: 2012).*

Hovy, Dirk, "The Enemy in Your Own Camp: How Well CanWe Detect Statistically-Generated Fake Reviews—An Adversarial Study", Proceedings of the 54th Annual Meeting of the Association for Computational Linguistics, pp. 351-356, Berlin, Germany, Aug. 7-12, 2016, pp. 351-356. (Year: 2016).*

International Search Report and Written Opinion to corresponding International Application No. PCT/US16/49567 dated Nov. 21, 2016 (8 pages).

Tencent Open Platform, available at http://web.archive.org/web/20150216040846/http://open.qq.com/eng/ (Feb. 16, 2015).

360 Mobile App Developer Center, available at http://web.archive.orgiweb/20150520191355/http://developer.360.cn/ (May 20, 2015).

* cited by examiner

METHOD, APPARATUS AND SYSTEM FOR DETECTING FRAUDULENT SOFTWARE PROMOTION

CROSS-REFERENCE TO RELATED APPLICATIONS

This application claims the benefit of priority from Chinese Patent Application No. 201510555824.X, filed on Sep. 1, 2015, entitled "Method, Apparatus and System for Detecting Software Spread Cheating," which is incorporated herein by reference in its entirety.

BACKGROUND

Field of the Disclosure

The present application relates to the field of Internet technologies, and in particular, relates to a method, an apparatus and a system for detecting fraudulent software promotion.

Description of Related Art

With the development of Internet technologies, people's demands on software applications are gradually increasing. Websites for downloading software applications are developing rapidly, the well-known websites in China are Pacific Download Center, Tencent Application Treasure, 360 Phone Assistant, Taobao Phone Assistant, PP Assistant and the like. The functions of these websites are all directed in providing a plethora of PC terminal or mobile wireless terminal software applications for users to download, install, upgrade, and uninstall software applications. On these websites, the users generally select software applications by referring to the download quantities and reputation of the software applications. Software applications with a high number of downloads and a good reputation (e.g., positive reviews) are usually preferred and downloaded by the users. Therefore, these two indicators (high number of downloads and a good reputation) greatly affect users' selection of the software applications. Some software application developers or promoters make use of these two indicators, and operate "review fraud" (or "reputation fraud") and "download number fraud" operations by unauthorized means. As a result, people are misled into downloading software applications that they promote, causing adverse social effects. At present, there is no technical solution to dedicatedly detect the problem of cheating on a software application promotion.

BRIEF SUMMARY

To solve at least the above technical problem, some embodiments of the present disclosure provide a method, an apparatus and a system for detecting fraudulent software promotion, to implement automatic detection of fraudulent software promotion and assist users to discriminate software applications, enhancing security in software downloading.

One aspect of the disclosure is drawn to a method for detecting fraudulent promotion of a software application. The method includes acquiring comment information associated with a software application, the comment information including one or more comments; calculating an average similarity or average information entropy of the comment information, wherein the average similarity is calculated based on a similarity between the one or more comments and wherein the average information entropy is calculated based on an information gain between the one or more comments; defining a determination threshold range for a category associated with the software application, wherein the determination threshold range is defined by a plurality of probability statistical distribution parameters based on average similarities or average information entropies of other applications associated with the category; and identifying the software application as fraudulent if the average similarity or average information entropy of the comment information is within the determination threshold range.

One aspect of the disclosure is drawn to a method for detecting fraudulent promotion of a software application. The method includes acquiring comment information and a number of downloads associated with a software application, the comment information including one or more comments; calculating a comment-to-download ratio associated with the software application, wherein the comment-to-download ratio is equal to a ratio of a total number of comments to the number of downloads; defining a determination threshold range for a category associated with the software application, wherein the determination threshold range is defined by a plurality of probability statistical distribution parameters based on comment-to-download ratios of other applications associated with the category; and determining that the software application promotes a fraudulent download number if the comment-to-download ratio of the software application is within the determination threshold range associated with the other applications associated with the category.

One aspect of the disclosure is drawn to an apparatus for detecting fraudulent promotion of a software application. The apparatus includes a processor and a non-transitory memory storing computer-executable instructions therein. When executed by the processor, the computer-executable instructions cause the apparatus to: acquire comment information and a category associated with a software application, the comment information including one or more comments; calculate an average similarity or average information entropy of the comment information, wherein the average similarity is calculated based on similarity between the one or more comments and wherein the average information entropy is calculated based on an information gain between the one or more comments; define a determination threshold range for the category associated with the software application, wherein the determination threshold range is defined by a plurality of probability statistical distribution parameters based on average similarities or average information entropies of other applications associated with the category; and identify the software application as fraudulent if the average similarity or average information entropy of the comment information is within the determination threshold range.

One aspect of the disclosure is drawn to an apparatus for detecting fraudulent promotion of a software application. The apparatus includes a processor and a non-transitory memory storing computer-executable instructions therein. When executed by the processor, the computer-executable instructions cause the apparatus to: acquire comment information and a number of downloads associated with a software application, the comment information including one or more comments; calculate a comment-to-download ratio associated with the software application, wherein the comment-to-download ratio is equal to a ratio of a total number of comments to the total number downloads; define a determination threshold range for the category associated with the software application, wherein the determination threshold range is defined by a plurality of probability statistical distribution parameters based on comment-to-download ratios of other applications associated with the category; and determine that the software application promotes a fraudulent download number if the comment-to-download ratio of the software application is within the determination threshold range associated with the other applications associated with the category.

One aspect of the disclosure is drawn to a system for detecting fraudulent promotion of a software application. The systems includes a data capturing apparatus configured to retrieve comment information and a number of downloads of a software application, the comment information including one or more comments and a data storage apparatus configured to receive data from the data capturing apparatus and store the comment information and the number of downloads of the software application. The system further includes an anti-cheating analyzing platform configured to retrieve comment information and the number of downloads of the software application from the data storage apparatus and further configured to calculate an average similarity or average information entropy of the comment information, wherein the average similarity is calculated based on a similarity between the one or more comments and wherein the average information entropy is calculated based on an information gain between the one or more comments; calculate a comment-to-download ratio associated with the software application, wherein the comment-to-download ratio is equal to a ratio of a total number of comments to the number of downloads; define a determination a first determination threshold range for a category associated with the software application, wherein the first determination threshold range is defined by a plurality of probability statistical distribution parameters based on average similarities or average information entropies of other applications associated with the category; define a determination a second determination threshold range for the category associated with the software application, wherein the second determination threshold range is defined by a plurality of probability statistical distribution parameters based on comment-to-download ratios of other applications associated with the category; determine that the software application is fraudulent if an average similarity or average information entropy of the comment information is within the first determined threshold range; and determine that the software application is fraudulent if a calculated comment-to-download ratio of the software application is within the second determination threshold range associated with the other applications associated with the category.

According to the technical solutions of the present disclosure, based on mathematical theorems of statistical distributions and low probability events, and using practical data such as the comment information and the number of downloads of a software application as a data basis of the statistical analysis, a determination threshold range may be adaptively defined, automatic detection of fraudulent software promotion can be implemented, and users are assisted to discriminate software applications, enhancing security in software downloading.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views.

DETAILED DESCRIPTION

Figure 1:
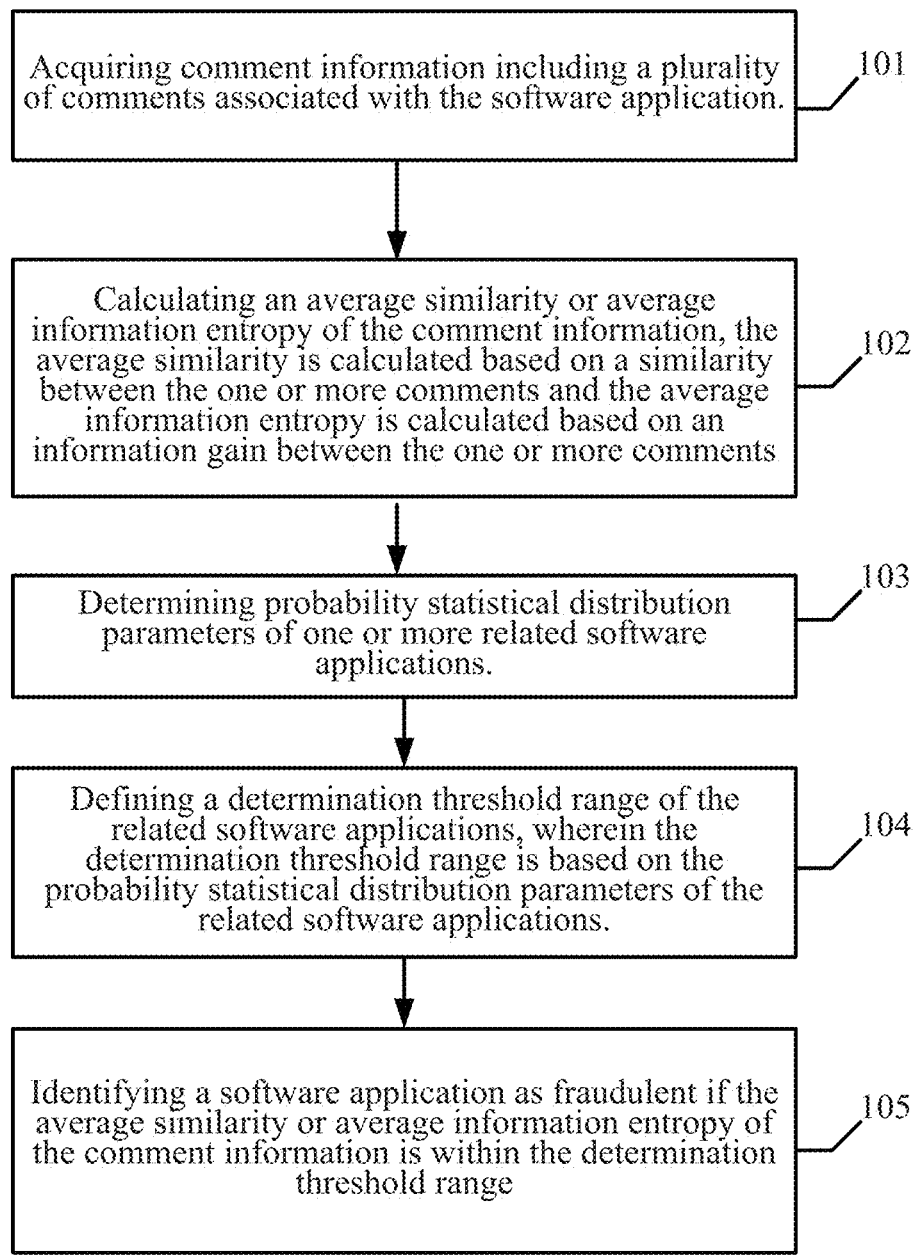
FIG. 1 is a flow diagram illustrating a method for detecting fraudulent software promotion according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

The present disclosure provides technical solutions for detecting whether a software application has cheating behaviors from the perspectives of "review fraud" and "download number fraud". In some embodiments, starting from the perspective of the "review fraud" of a software application, the distribution of comment information of the software applications in the same category is analyzed based on the statistical distribution theorem. An average similarity or average information entropy of the comment information of the software application is mainly used as a data basis of the statistical analysis; the probability statistical distribution parameter of the comment information of the software applications in the same category is acquired via analysis; and a determination threshold range is defined according to the low probability event theorem in the probability statistical distribution, such that the determination threshold range is a threshold range for determining the low probability event. Therefore, when the average similarity or average information entropy of a to-be-detected software application falls within the corresponding determination threshold range corresponding to the software category to which the to-be-detected software application pertains, it indicates that the event that the to-be-detected software application has such comment information is a low probability event, and it is thus determined that the to-be-detected software application is a promotion cheating software application for fraudulent comments.

In other embodiments, starting from the perspective of "download number fraud" of a software application, the distribution of comment information of the software applications in the same category is analyzed based on the statistical distribution theorem. A comment-to-download ratio is mainly used as a data basis of the statistical distribution; the probability statistical distribution parameter of the comment-to-download ratio of the software applications in the same category is acquired via analysis; and a determination threshold range is defined according to the probability statistical distribution parameter, that is, the determination threshold range is defined mainly based on the low probability event theorem in the statistical distribution, such that the determination threshold range is a threshold range for determining the low probability event. Therefore, when the comment-to-download ratio of a to-be-detected software application falls within the determination threshold range, it indicates that the event that the to-be-detected software application has the comment-to-download ratio is a low probability event, and it is thus determined that the to-be-detected software application is a cheating software application using "fraudulent download number" promotion.

FIG. 1 is a flow diagram illustrating a method for detecting fraudulent software promotion according to some embodiments of the present disclosure. The method may be performed by a user machine, which may be embodied by a personal computer (PC), or may be various types of website servers, for example, a Web server or an application server.

In step 101, the method acquires comment information associated with a software application, the comment information including one or more comments.

In some embodiments of the present disclosure, the platform refers to a software promotion platform or website, and the download page of a software application on the platform may be crawled by using a web crawler. As one example, specific information on the download page may be crawled by using the "Jsoup" sentinel crawling technology. In embodiments of the present disclosure, the "Jsoup" sentinel crawling technology may be used to crawl comment information on platform pages, also referred to, briefly, as comments. Since the comments made by users are recorded on the website in a chronological order of their publication, after the comment information is crawled, the comment information may be stored in a database in the chronological order of their publication.

In one embodiment, an open-source database, such as MySQL or PostgreSQL, may be used, while other databases may be used.

In step 102, the method calculates an average similarity or average information entropy of the comment information of the software application, wherein the average similarity is calculated based on a similarity between the one or more comments and the average information entropy is calculated based on an information gain between the one or more comments.

Figure 2:
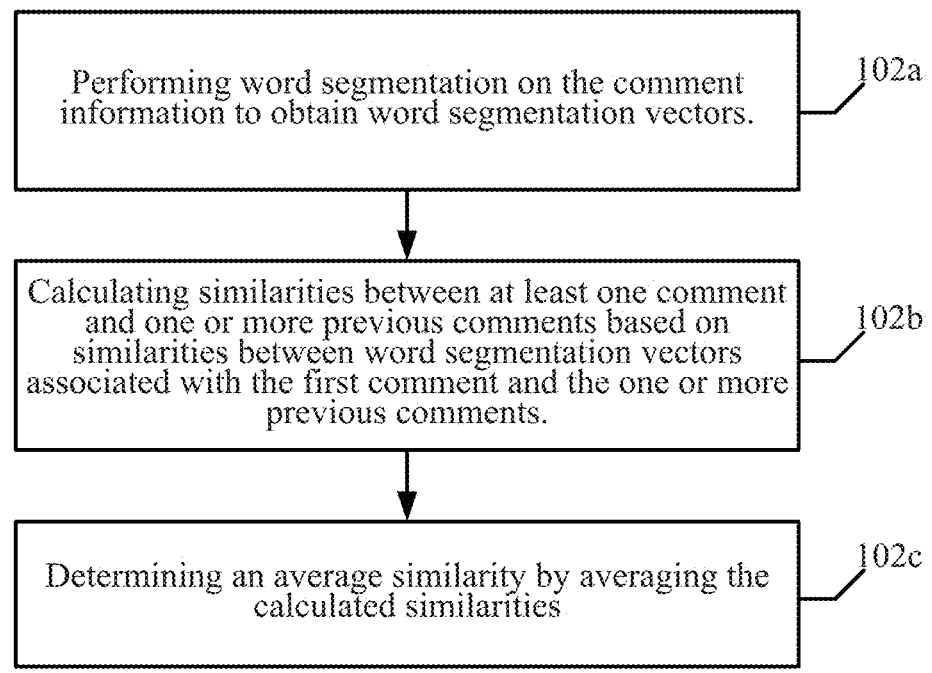
FIG. 2 is a flow diagram illustrating a step in a method for detecting fraudulent software promotion according to some embodiments of the present disclosure.

In some embodiments, the process of calculating an average similarity or average information entropy of the comment information of the software application may include the method illustrated in FIG. 2.

In step 102a, the method performs word segmentation on the comment information associated with the software application to obtain word segmentation vectors, each piece of comment information corresponding to a word segmentation vector.

In step 102b, the method calculates a similarity between an at least one comment of the software application and one or more previous comments according to similarities between word segmentation vectors associated with the first comment and the one or more previous comments, and using a maximum similarity as a similarity of the Nth piece of comment information, wherein N is greater than or equal to 1.

In step 102c, the method determines an average similarity of the comment information of the software application via a calculation method of averages according to the similarity of the comment information.

In some embodiments, the above step of calculating a similarity between an Nth piece of comment information of the software application and its previous one or a plurality of pieces of comment information according to a calculation method of word segmentation vectors and vector similarities, and using a maximum similarity as a similarity of the Nth piece of comment information may be specifically practiced in one or a plurality of implementation manners as follows.

A first implementation comprises calculating a similarity between an Nth piece of comment information of the software application and the previous N−1 pieces of comment information according to a calculation method of word segmentation vector and vector similarity, and using a maximum similarity as a similarity of the Nth piece of comment information. This is calculated for all N comments. Thus, in this implementation, the similarity is calculated by comparing each piece of comment information with all the previous comment information by means of traverse processing, ensuring the reliability of the obtained similarity.

A second implementation comprises calculating a similarity between an Nth piece of comment information of the software application and a previous piece of sampled comment information according to a calculation method of word segmentation vector and vector similarity, and using a maximum similarity as a similarity of the Nth piece of comment information, wherein the sampled comment information refers to comment information whose similarity is less than a predetermined threshold. This is calculated only for the sampled comments. Thus, in the second implementation manner, depending on the specific value of the similarity, comment information satisfying representative requirements is sampled, and the similarity is calculated by comparing each piece of comment information with only its previously sampled comment information, reducing the calculation workload, with no need of traversing all the comment information for exhaustive comparisons. Since the sampled comment information is typical and representative, this manner reduces the calculation workload while ensuring the reliability of the similarity, so as to improve the calculation efficiency.

With respect to a software application having a large quantity of comment information, to calculate the similarity more quickly and more efficiently, the second implementation may be used. In the method of sampling the comment information, the principle of the sampling is to extract comment information that is representative, that is, relative to all the previous comment information, comment information having a small similarity is extracted. When the similarity of comment information is less than a predetermined threshold, the comment information may be extracted. During calculation of an information entropy of the current comment information, the corresponding similarity may be calculated by comparing the current comment information with only the previously extracted comment information. In this way, through sampling, the calculation workload of the similarity is reduced, and the calculation efficiency of the average similarity is improved.

To further describe the above implementations, the following description is given with reference to specific examples.

In an example of the first implementation manner, if the first piece of comment information has a similarity of 0 (since there is no comment information made before this piece of comment information), the second piece of comment information has a similarity of 0.8 relative to the first piece of comment information, and the third piece of comment information has a similarity of 0.5 relative to the first piece of comment information and has a similarity of 0.9 relative to the second piece of comment information, then the similarity of the third piece of comment information is taken as a maximum between the two similarities, that is, 0.9. Therefore, an average similarity of the three pieces of comment information is the average of 0, 0.8, and 0.9, or 0.57, and analogously, an average of all the comment information of a software application is calculated, which is used as a corresponding average similarity of the comment information of the software application.

In the implementation process of "similarity calculation", word segmentation tools such as IKAnalyzer, Pangu Segment, Paoding, and the like may be used, or an approach based on semantic dependency, a dictionary-based approach or the like approaches may also be used. One piece of comment information is segmented into a plurality of semantically meaningful words. That is, word segmentation is performed for the comment information to acquire word segmentation vectors, wherein one piece of comment information corresponds to one word segmentation vector. During the process of word segmentation, synonyms may also be subjected to certain treatment. Upon word segmentation, the word2vec algorithm may be employed to calculate a maximum similarity of all the words in the comment information, and the maximum similarity that is acquired via a calculation is used as the similarity of the comment information.

In an example of the second implementation manner, assume that the predetermined threshold a is 0.6, and the first piece of comment information has a similarity of 0, and since 0<a, the first piece of comment information is extracted. The second piece of comment information has a similarity of 0.8 relative to the first piece of comment information, and since 0.8>a, the second piece of comment information is not sampled. During calculation of the similarity of the third piece of comment information relative to the previous comment information, a comparison is only made between the third piece of comment information and the sampled comment information. Herein, a comparison is made between the third piece of comment information and only the first piece of comment information. Assume that the third piece of comment information has a similarity of 0.3 relative to the first piece of comment information. Since 0.3<a, the third piece of comment information is also sampled. In this way, two pieces of comment information among the first three pieces of comment information are sampled, that is, the first piece of comment information and the third piece of comment information. Analogously, comment information satisfying the conditions may be sampled. In this way, through sampling, the calculation workload of the information gain is reduced, and the calculation efficiency of the average similarity is improved.

Figure 3:
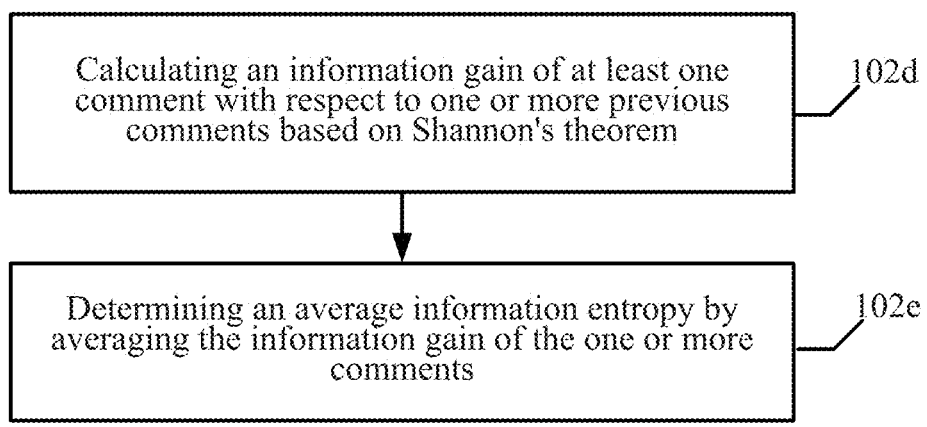
FIG. 3 is a flow diagram illustrating a step in a method for detecting fraudulent software promotion according to some embodiments of the present disclosure.

In some embodiments, the process of calculating an average information entropy of the comment information of the software application according to an information entropy of the comment information of the software application is described in more detail below in conjunction FIG. 3.

In step 102*d*, the method calculates an information gain of at least one comment with respect to one or more previous comments according to Shannon's theorem, and selects a minimum information gain as an information gain for the Nth piece of comment information, wherein N is greater than or equal to 1; and In step 102e, the method determines an average information entropy of the comment information of the software application via by averaging to the information gain of the one or more comments.

In some embodiments, the above process of calculating an information gain of an Nth piece of comment information over its previous one or a plurality of pieces of comment information according to the Shannon theorem, and selecting a minimum information gain as an information gain for the Nth piece of comment information may be implemented in, but is not limited to, the following two implementations.

A first implementation comprises calculating an information gain of an Nth piece of comment information over previous N−1 pieces of comment information according to the Shannon theorem, and selecting a minimum information gain as an information gain for the Nth piece of comment information. This is done for all N comments.

A second implementation comprises calculating an information gain of an Nth piece of comment information relative to previous sampled comment information according to the Shannon theorem, and selecting a minimum information gain as the information gain of the Nth piece of comment information, wherein the sampled comment information refers to comment information having an information gain greater than a predetermined threshold. This is done for all comments in the sampled comments.

The second implementation is described more fully using the following example. Assume that the predetermined threshold b is 0.2, and the first piece of comment information has an information gain of 1 and, since 1>b, the first piece of comment information is extracted. The second piece of comment information has an information gain of 0.1 relative to the first piece of comment information, and since 0.1<b, therefore, the second piece of comment information is not sampled. During calculation of the information entropy or similarity of the third piece of comment information relative to the previous comment information, a comparison is made between the third piece of comment information and only the sampled comment information. Herein, a comparison is made between the third piece of comment information and only the first piece of comment information. Assume that the third piece of comment information has an information gain of 0.3 relative to the first piece of comment information, and since 0.3>b, therefore, the third piece of comment information is also sampled. In this way, two pieces of comment information among the first three pieces of comment information are sampled, that is, the first piece of comment information and the third piece of comment information. Analogously, comment information satisfying the conditions may be sampled. In this way, through sampling, the calculation workload of the information gain is reduced, and the calculation efficiency of the average information entropy of improved.

Returning to FIG. 1, in step 103, the method determines one or more probability statistical distribution parameters of related software applications (e.g., in a same category as the software application) via a calculation according to a respective average similarities or average information entropies of each software application in the same category. This step is based on a probability statistics approach, and analyzes data distribution of valid information in the comment information of software applications in the same category.

The software applications are mainly categorized according to the attributes of the software applications, for example: bank application software applications, game software applications, shopping software applications, tool software applications, instant messaging software applications and the like. Nevertheless, the software applications may also be categorized from other perspectives. The categorization of the software applications is not subjected to any specific limitation in the present application. Instead, the probability statistical distribution of the comment information of the software applications in the same category is studied from the perspective of users' usage.

In this step, the average similarity or average information entropy is used as data basis of the probability statistical distribution, such that the statistically acquired distribution parameter has a high adaptability, and can thus better adapt to the software detection environments for the same category. Therefore, the reliability of the detection is relatively high.

In some embodiments, this step may be implemented in, but is not limited to, one or more of the following implementation.

A first implementation uses the respective corresponding average similarity or average information entropy of each software application in the same category as a sample, calculating an expectation, or mean, and a variance of the sample, and using the expectation and the variance of the sample as the corresponding probability statistical distribution parameter of the software application in the same category.

Figure 4:
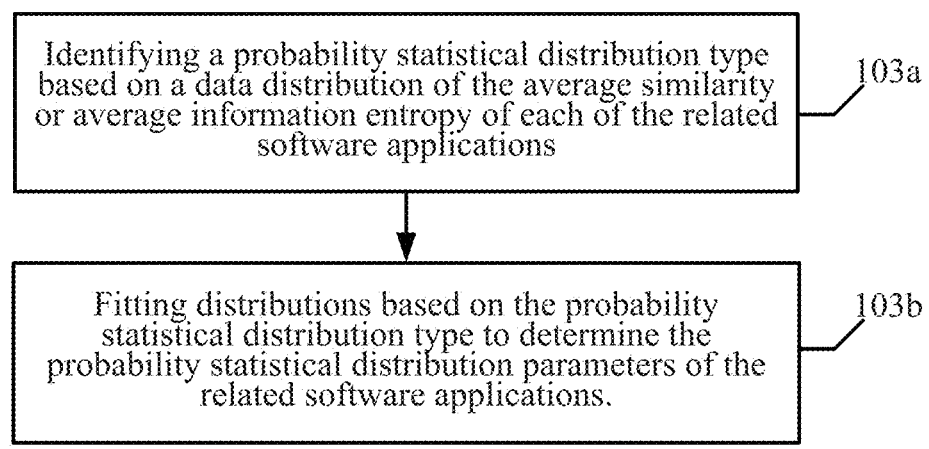
FIG. 4 is a flow diagram illustrating a step in a method for detecting fraudulent software promotion according to some embodiments of the present disclosure.

A second implementation (illustrated in FIG. 4) is a generalization of the first implementation. In step 103a, the method identifies a probability statistical distribution type based on a data distribution of the respective corresponding average similarity or average information entropy of the related software applications. In step 103b, the method fits the distribution based on the probability statistical distribution type to determine the corresponding probability statistical distribution parameters of the related software applications.

The inventors of the present disclosure have identified that when there is a large amount of sample data, the calculation workload in the second implementation is greater than the calculation workload in the first implementation. Therefore, in this case, to save the calculation workload, the first implementation may be selected. If in some scenarios, strict requirements are imposed on the accuracy and reliability of the distribution parameter, the second implementation may be selected in these scenarios.

In some embodiments, selecting a "probability statistical distribution type," includes identifying a sample data distribution graph by analyzing the sample data, and selecting a corresponding probability statistical distribution type according to the data distribution graph. For example, if it is seen from the data distribution graph that the data distribution is close to exponential distribution, then an exponential distribution type may be selected. Still for example, if it is seen from the data distribution graph that the data distribution is close to Poisson distribution, then a Poisson distribution type may be selected. In practical application, there is no limitation to the probability distribution type, and the specific situation is determined according to the practical sample data.

However, through studies, the inventors have identified that the comment information and comment-to-download ratios of many categories of software applications are close to a normal distribution. Therefore, during selection of the probability distribution type, the normal distribution may be directly selected. In this case, with respect to the normal distribution, a corresponding distribution parameter of the software applications in the same category is acquired via fitting, wherein the distribution parameter comprises an average value and a standard deviation.

Returning to FIG. 1, in step 104 the method defines a determination threshold range of the related software applications based on the corresponding probability statistical distribution parameter of the related software applications. In one embodiment, the determination threshold range is used for determining a threshold range of a low probability event.

In step 105, the method identifies that a software application as a fraudulent when detecting that the average similarity or average information entropy of the comment information is within the determination threshold range corresponding to the software category to which the to-be-detected software application pertains.

It should be herein noted that if the determination threshold is defined according to the corresponding probability statistical distribution parameter of the software applications in the same category, which is acquired via a calculation according to a respective corresponding average similarity of each software application in the same category, when step 105 is performed, the average similarity of the comment information of the to-be-detected software application is used as a determination factor, to implement a conditional determination.

It should be herein noted that if the determination threshold is defined according to the corresponding probability statistical distribution parameter of the software applications in the same category, which is acquired via a calculation according to a respective corresponding average information entropy of each software application in the same category, when step 105 is performed, the average information entropy of the comment information of the to-be-detected software application is used as a determination factor, to implement a conditional determination. In the probability statistics, an event whose probability is very close to 0 (the probability is very small) is called a low probability event. However, the present disclosure does not specify to what extent a probability needs to be small so as to qualify as a low probability event. Instead, the standards for qualifying as a low probability event are different for different occasions. For example, when the normal distribution type is selected in step 103, the respective corresponding average information entropy of each software application is used as the data basis, the distribution parameter acquired via a calculation comprises an average value and a standard deviation, and the corresponding determination threshold range is defined based on the distribution parameter. The smaller the average information entropy of the comment information of the software application, the smaller the quantity of the valid information in the software comment information, and the greater the suspicion of "download number fraud". Therefore, in combination with the characteristics of the low probability event in the normal distribution, the determination threshold range may be defined as $(-\infty, \mu-1.96\sigma)$ according to an empirical value, wherein $\mu$ is the average value, and $\sigma$ is the standard deviation. Nevertheless, the determination threshold range may be defined as $(-\infty, \mu-\sigma)$, $(-\infty, \mu-2\sigma)$, $(-\infty, \mu-2.58\sigma)$ or the like. Whether the software application is a "download number fraud" cheating software application is determined according to the average information entropy of the comment information of the software application and the determination threshold range. When the average information entropy of the comment information of the software application falls within the determination threshold range, it is determined that the software application is a "download number fraud" cheating software application.

When the normal distribution type is selected in step 103, the respective corresponding average similarity of each software application is used as the data basis, the distribution parameter acquired via a calculation comprises an average value and a standard deviation. If the average similarity of the comment information of the software application is high, then it means all comment information of the software application is similar, whereas no similarity can be drawn from comment information of a normal software application. In this case, it is indicated that the software application is suspected of being a "download number fraud" software application. Therefore, in combination with the characteristics of the low probability event in the normal distribution, the determination threshold range may be defined as $(\mu+1.96\sigma, +\infty)$ according to the empirical value, wherein $\mu$ is the average value, and $\sigma$ is the standard deviation. Nevertheless, the determination threshold range may be defined as $(\mu+\sigma, +\infty)$, $(\mu+1.96\sigma, +\infty)$, $(\mu+2\sigma, +\infty)$, or $(\mu+2.58\sigma, +\infty)$, $(\mu+3\sigma, +\infty)$ or the like. Whether the software application is a "review fraud" cheating software application is determined according to the average similarity of the comment information of the software application and the determination threshold range. When the average similarity of the comment information of the software application falls within the determination threshold range, it is determined that the software application is a "review fraud" cheating software application.

The above definition of the determination threshold range mainly depends on strictness of the determination, and a specific range may be defined according to actual needs and is not limited to the above threshold ranges.

For example, when the probability statistical distribution parameter is acquired via a calculation according to the average information entropy, and the determination threshold range corresponding to the software category defined based on the probability statistical distribution parameter is $(-\infty, \mu-1.96\sigma)$, it is determined that a software application in that software category is a promotion cheating software application for "review fraud" when the average information entropy of the comment information of the software category falls within the determination threshold range.

It may be seen from the embodiments of the present disclosure, starting from the perspective of the "review fraud cheating" of the software application, the distribution of comment information of the software applications in the same category is analyzed based on the probability statistical distribution theorem. An average similarity or average information entropy of the comment information of the software application is mainly used as a data basis of the probability statistical analysis; the probability statistical distribution parameter of the comment information of the software applications in the same category is acquired via analysis; and a determination threshold range is defined according to the probability statistical distribution parameter, that is, mainly according to the low probability event theorem in the probability statistical distribution, such that the determination threshold range is a threshold range for determining the low probability event. Therefore, the average similarity or average information entropy of a to-be-detected software application falling within the corresponding determination threshold range corresponding to the software category to which the to-be-detected software application pertains indicates that the event that the to-be-detected software application has such comment information is a low probability event, and it is thus determined that the to-be-detected software application is a promotion cheating software application for fraudulent comments.

In addition, the present disclosure further provides another method for detecting fraudulent software promotion. The method implements detection from the perspective of "download number fraud" promotion cheating.

Figure 5:
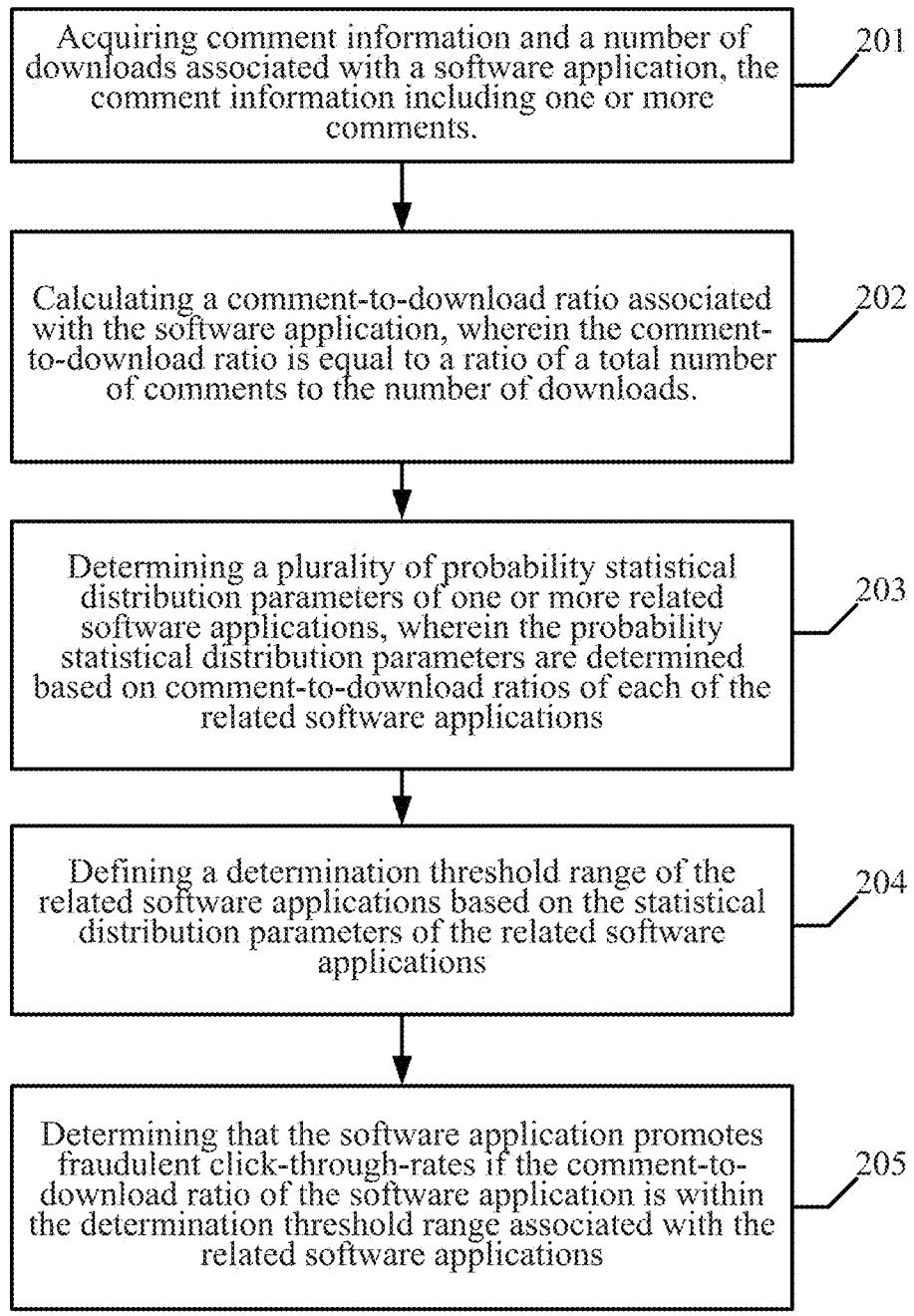
FIG. 5 is a flow diagram illustrating a method for detecting fraudulent software promotion according to some embodiments of the present disclosure.

Referring to FIG. 5, FIG. 5 is a flow diagram illustrating a method for detecting fraudulent software promotion according to some embodiments of the present disclosure. The method may be performed by a user machine, which may be embodied by, for example, a personal computer (PC), or may be various types of website servers, for example, a Web server or an application server.

In step 201, the method acquires comment information and a number of downloads of a software application on a platform.

Generally for a website, the promoted software application crawling point has a fixed tag position on an HTML page. As such, the HTML page tag may be analyzed, and a number of downloads, comment information, and a comment quantity and the like may be extracted by using the "Jsoup" tool.

In one embodiment, both the comment information and the number of downloads of the software applications are respectively stored in advance in the database in the form of data sheets. In one embodiment, a data sheet corresponding to the software application may be searched from the database to acquire the corresponding comment information and number of downloads. In this way, the burden caused by accesses to the website is mitigated.

In step 202, the method calculates a comment-to-download ratio of the software application, wherein the comment-to-download ratio is equal to a ratio of the total number of comments to the total number of downloads.

The inventors have identified that singly checking the number of downloads of a software application fails to reflect the actual usage conditions of the software application, and is simply subjected to a misjudgment. In addition, the inventors have found that, with respect to the promoted software applications which the software promoters automatically download by using a tool, a many downloads are accumulated within a short period of time. However, the amount of comment information is relatively less, since a general download number fraud software application does not have the review fraud function, and no comment information would be written for the software application. These factors cause the comment-to-download ratio to be extremely small. On this basis, the inventors propose that the actual conditions of the number of downloads are measured from the perspective of the comment-to-download ratio to detect whether the software application is subjected to a cheating behavior for download number fraud.

In step 203, the method determines a plurality of probability statistical distribution parameters of one or more related software applications (e.g., those in the same category) based on comment-to-download ratios of the related software applications.

In one embodiment, the method uses the respective corresponding comment-to-download ratio of each software application in the same category as a sample, calculating an expectation and a variance of the sample, and using the expectation and the variance of the sample as the corresponding probability statistical distribution parameter of the software application in the same category.

Figure 6:
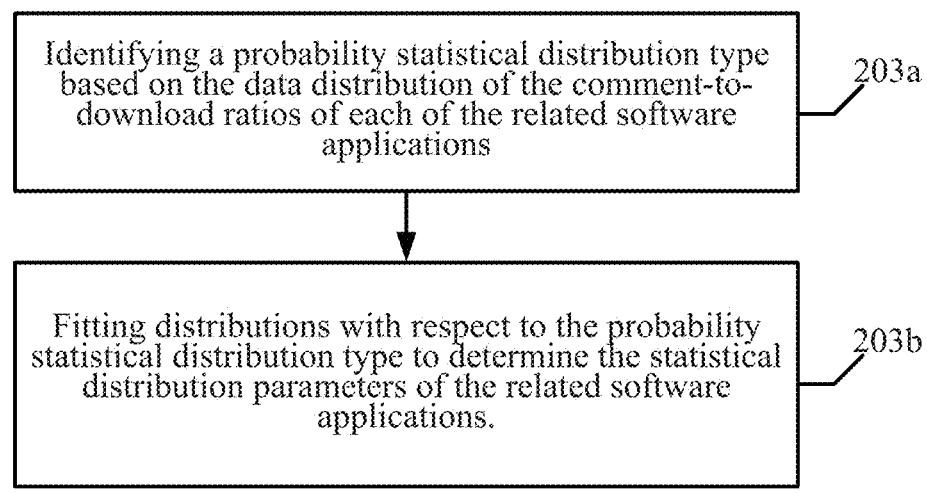
FIG. 6 is a flow diagram illustrating a step in a method for detecting fraudulent software promotion according to some embodiments of the present disclosure.

FIG. 6 presents an alternative embodiment for determining statistical distribution parameters of a plurality of related software applications.

In step 203a, the method identifies a probability statistical distribution type based on the data distribution of the comment-to-download ratio of the related software applications.

In step 203b, the method fits a distribution with respect to the probability statistical distribution type to determine the corresponding probability statistical distribution parameters of the related software application.

In step 204, the method defines a determination threshold range of the related software applications based on the statistical distribution parameters of the related software applications. In one embodiment, the determination threshold range is used for determining a threshold range of a low probability event.

The definition of the determination threshold range may be referenced to the relevant description in the above embodiments, which is thus not described herein any further because the definitions are similar.

In step 205, the method determines whether the software application promotes a fraudulent download number if the comment-to-download ratio of the software application is within the determination threshold range corresponding to the related software applications (e.g., corresponding to the category of the software application).

In addition, the inventors also point out that after a software application is detected as a promotion cheating software application for a fraudulent download number, the detection result may be generated as a result table and stored in a database. In this way, when a user browses the interface of the software application, the use may query the detection result of the software application from the result table. As such, the detection result is quickly displayed for the user, and the user is assisted to identify whether the software application is a promotion cheating software application.

As seen from the embodiments of the present disclosure, starting from the perspective of "download number fraud" cheating of a software application, the distribution of comment information of the software applications in the same category is analyzed based on the probability statistical distribution theorem. A comment-to-download ratio is mainly used as a data basis of the probability statistical distribution; the probability statistical distribution parameter of the comment-to-download ratio of the software applications in the same category is acquired via analysis; and a determination threshold range is defined according to the probability statistical distribution parameter, that is, the determination threshold range is defined mainly based on the low probability event theorem in the probability statistical distribution, such that the determination threshold range is a threshold range for determining the low probability event. Therefore, the comment-to-download ratio of a to-be-detected software application falling within the determination threshold range indicates that the event that the to-be-detected software application having such a comment-to-download ratio is a low probability event, and it is thus determined that the to-be-detected software application is a cheating software application using "fraudulent download number cheating" promotion.

Figure 7:
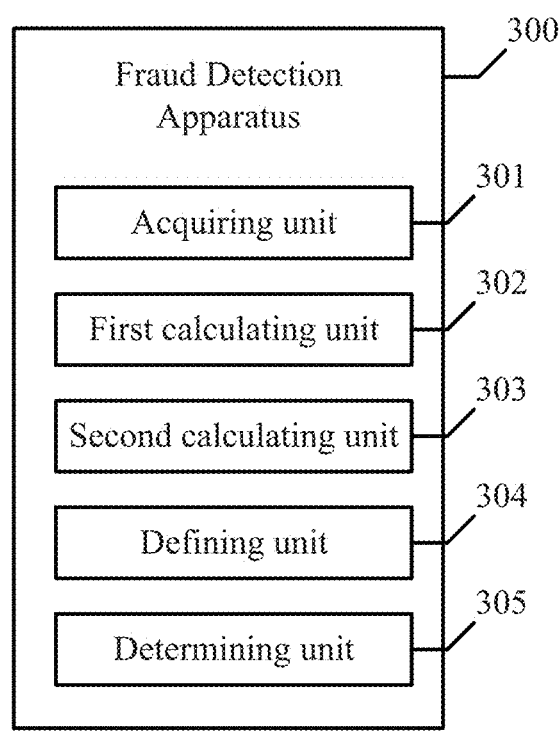
FIG. 7 is a structural diagram illustrating an apparatus for detecting fraudulent software promotion according to some embodiments of the present disclosure.

Corresponding to the methods for detecting fraudulent software promotion, some embodiments of the present disclosure further provide an apparatus for detecting fraudulent software promotion. Referring to FIG. 7, FIG. 7 is a structural diagram of an apparatus for detecting fraudulent software promotion according to some embodiments of the present disclosure. The apparatus is used for detecting a "review fraud" promotion cheating software application. The apparatus 300 may comprise an acquiring unit 301, a first calculating unit 302, a second calculating unit 303, a defining unit 304, and a determining unit 305. The internal structures and connections of the apparatus are further described with reference to the working principles of the apparatus.

The acquiring unit 301 is configured to acquire comment information of a software application on a platform.

The first calculating unit 302 is configured to calculate an average similarity or average information entropy of the comment information of the software application according to a similarity or an information gain of the comment information of the software application.

The second calculating unit 303 is configured to acquire corresponding probability statistical distribution parameters of the software applications in the same category via a calculation according to a respective corresponding average similarity or average information entropy of each software application in the same category.

The defining unit 304 is configured to define a corresponding determination threshold range of the software applications in the same category according to the corresponding probability statistical distribution parameter of the software applications in the same category, wherein the determination threshold range is used for determining a threshold range of a low probability event.

The determining unit 305 is configured to determine that a to-be-detected software application is a promotion cheating software application for fraudulent comments when detecting that the average similarity or average information entropy of the comment information of the to-be-detected software application falls within the determination threshold range corresponding to the software category to which the to-be-detected software application pertains.

Figure 8:
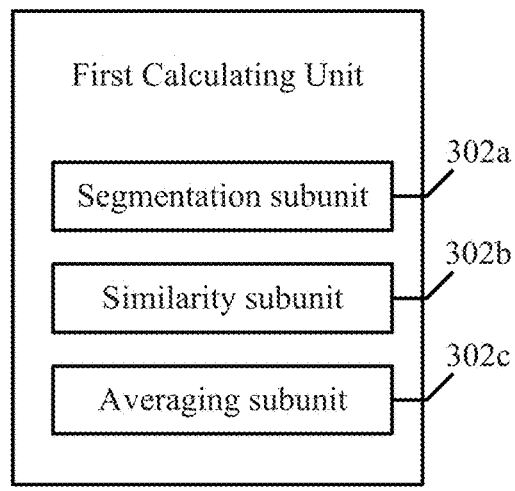
FIG. 8 is a structural diagram illustrating an element in an apparatus for detecting fraudulent software promotion according to some embodiments of the present disclosure.

In some embodiments, the first calculating unit includes the following elements, illustrated in more detail in FIG. 8.

A word segmenting subunit 302*a* is configured to perform word segmentations for the comment information of the software application to obtain a word segmentation vector, wherein each piece of comment information corresponds to a word segmentation vector.

A similarity calculating subunit 302*b* is configured to calculate a similarity between an Nth piece of comment information of the software application and its previous one or a plurality of pieces of comment information according to a calculation method of word segmentation vectors and vector similarities, and use a maximum similarity as the similarity of the Nth piece of comment information, wherein N is greater than or equal to 1.

An average similarity calculating subunit 302*c* is configured to acquire an average similarity of the comment information of the software application via a calculation method of averages according to the similarity of the comment information.

Figure 9:
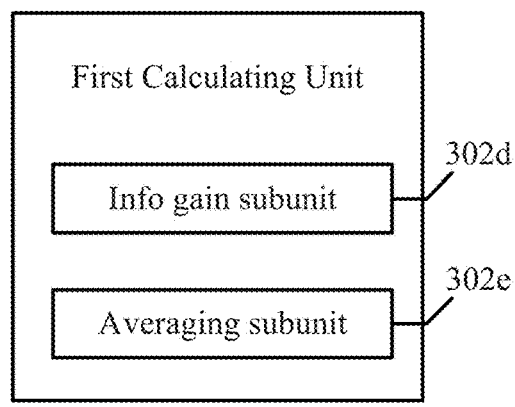
FIG. 9 is a structural diagram illustrating an element in an apparatus for detecting fraudulent software promotion according to some embodiments of the present disclosure.

In some embodiments, the first calculating unit includes the following (FIG. 9).

An information gain calculating subunit 302*d* is configured to calculate an information gain of an Nth piece of comment information over its previous one or a plurality of pieces of comment information according to the Shannon theorem, and select a minimum information gain as the information gain of the Nth piece of comment information, wherein N is greater than or equal to 1.

An average information entropy calculating subunit 302*e* is configured to acquire an average information entropy of the comment information of the software application via a calculation method of averages according to the information gain of the comment information.

In some embodiments, the second calculating unit is specifically configured to:

use the respective corresponding average similarity or average information entropy of each software application in the same category as a sample, calculate an expectation and a variance of the sample, and use the expectation and the variance of the sample as the corresponding probability statistical distribution parameters of the software application in the same category.

Figure 10:
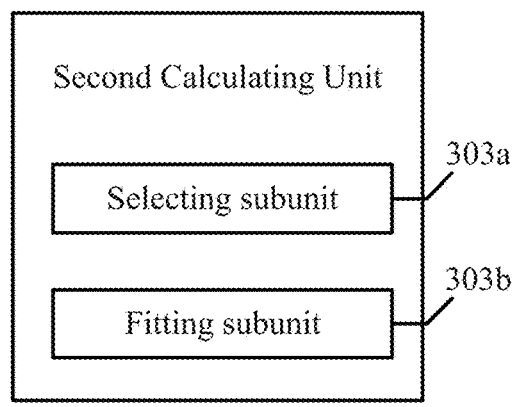
FIG. 10 is a structural diagram illustrating an element in an apparatus for detecting fraudulent software promotion according to some embodiments of the present disclosure.

In some embodiments, the second calculating unit includes the following elements, illustrated in more detail in FIG. 10.

A selecting subunit 303*a* is configured to select a probability statistical distribution type according to the data distribution of the respective corresponding average similarity or average information entropy of the software applications in the same category.

A fitting subunit 303*b* is configured to fit distributions with respect to the probability statistical distribution type to acquire the corresponding probability statistical distribution parameters of the software application in the same category.

In some embodiments, the selecting subunit is specifically configured to select a normal distribution type according to the data distribution of the respective corresponding average similarity or average information entropy of the software applications in the same category.

The fitting subunit may also be specifically configured to fit distributions with respect to the normal distribution type to acquire corresponding distribution parameters of the software applications in the same category, wherein the distribution parameters comprise an average value and a standard deviation.

The defining unit may also be specifically configured to define the corresponding determination threshold range of the software applications in the same category as $(-\infty, \mu-\sigma)$, $(-\infty, \mu-1.96\sigma)$, $(-\infty, \mu-2\sigma)$, $(-\infty, \mu-2.58\sigma)$, $(\mu+\sigma, +\infty)$, $(\mu+1.96\sigma, +\infty)$, $(\mu+2\sigma, +\infty)$ or $(\mu+2.58\sigma, +\infty)$ according to the corresponding probability statistical distribution parameters of the software applications in the same category, wherein $\mu$ is the average value and $\sigma$ is the standard deviation.

Figure 11:
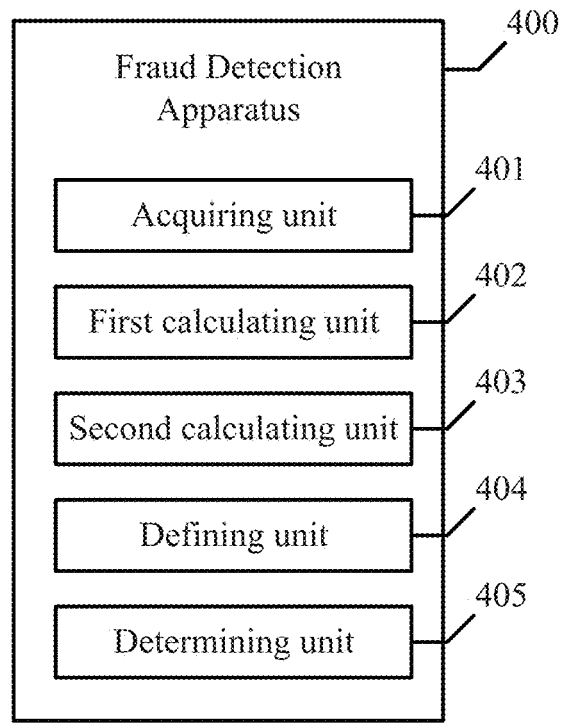
FIG. 11 is a structural diagram illustrating an apparatus for detecting fraudulent software promotion according to some embodiments of the present disclosure.

In addition, the present disclosure provides another apparatus for detecting fraudulent software promotion. Referring to FIG. 11, FIG. 11 is a structural diagram illustrating an apparatus for detecting fraudulent software promotion according to some embodiments of the present disclosure. The apparatus as illustrated in FIG. 11 is configured to detect a software application for "fraudulent download number" promotion cheating. The apparatus 400 may comprise an acquiring unit 401, a first calculating unit 402, a second calculating unit 403, a defining unit 404, and a determining unit 405. The internal structures and connections of the apparatus are further described with reference to the working principles of the apparatus.

The acquiring unit 401 is configured to acquire comment information and a number of downloads of a software application on a platform.

The first calculating unit 402 is configured to calculate a comment-to-download ratio of the software application, the comment-to-download ratio being equal to a ratio of the total number of pieces of comment information to the total number of downloads.

The second calculating unit 403 is configured to acquire corresponding probability statistical distribution parameters of the software applications in the same category via a calculation according to respective corresponding comment-to-download ratios of the software applications in the same category.

The defining unit 404 is configured to define a corresponding determination threshold range of the software applications in the same category according to the corresponding probability statistical distribution parameters of the software applications in the same category, wherein the determination threshold range is used for determining a threshold range for events with a low probability.

The determining unit 405 is configured to determine that a to-be-detected software application is a promotion cheating software application for fraudulent download number when detecting that the comment-to-download ratio of the to-be-detected software application falls within the determination threshold range corresponding to the software category to which the to-be-detected software application pertains.

In some embodiments, the second calculating unit is specifically configured to:

use the respective corresponding comment-to-download ratio of each software application in the same category as a sample, calculate an expectation and a variance of the sample, and use the expectation and the variance of the sample as the corresponding probability statistical distribution parameters of the software application in the same category.

Figure 12:
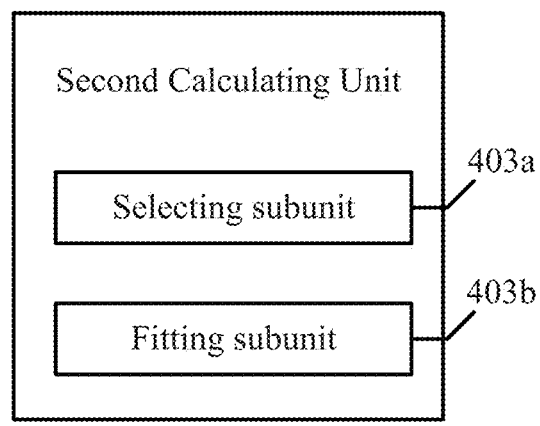
FIG. 12 is a structural diagram illustrating an element in an apparatus for detecting fraudulent software promotion according to some embodiments of the present disclosure.

In some embodiments, the second calculating unit includes the following elements, illustrated in more detail in FIG. 12.

A selecting subunit 403a is configured to select a probability statistical distribution type according to the data distribution of the respective corresponding comment-to-download ratio of the software applications in the same category.

A distributing subunit 403b is configured to fit distributions with respect to the probability statistical distribution type to acquire the corresponding probability statistical distribution parameters of the software application in the same category.

As seen from the embodiments of the present disclosure, with the apparatus according to the present disclosure, based on the mathematical theorems of the probability statistical distribution and the low probability event, and using practical data such as the comment information and the number of downloads of a software application as a data basis of the statistical analysis, a determination threshold range may be adaptively defined, automatic detection of the fraudulent software promotion can be implemented, and users are assisted to discriminate software applications, enhancing security in software downloading.

In addition, it should be noted that in practical application, to thoroughly detect whether a software application is a promotion cheating software application, the above methods or apparatuses for detecting "review fraud" and "download number fraud" promotion cheating may be used.

Figure 13:
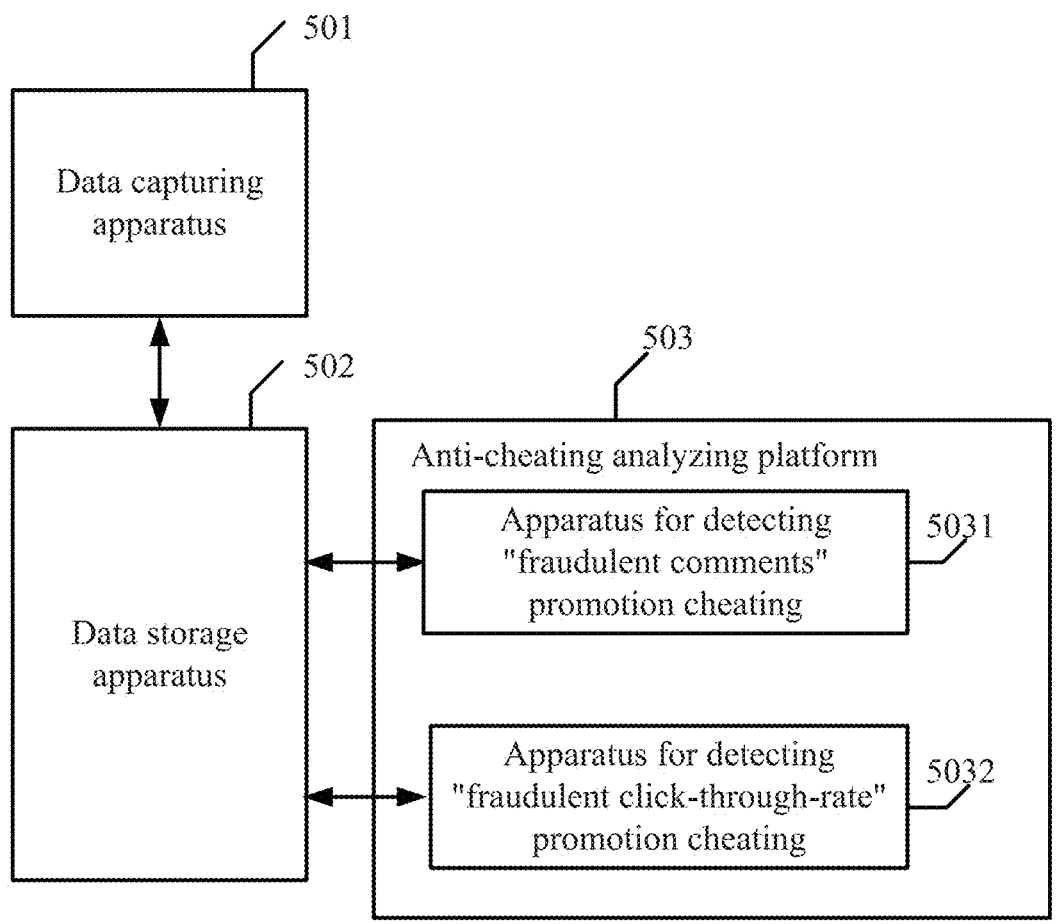
FIG. 13 is a structural diagram illustrating a system for detecting fraudulent software promotion according to some embodiments of the present disclosure.

Finally, in some embodiments the present disclosure further provides a system for detecting fraudulent software promotion. Referring to FIG. 13, the system includes a data capturing apparatus 501, a data storage apparatus 502, and an anti-cheating analyzing platform 503.

The anti-cheating analyzing platform includes two of the apparatuses described in the above apparatus embodiments, that is, an apparatus 5031 for detecting "review fraud" promotion cheating and an apparatus 5032 for detecting "download number fraud" promotion cheating as described above.

The data capturing apparatus 501 is configured to retrieve comment information and a number of downloads of a software application from a platform.

The data storage apparatus 502 is configured to store the comment information and the number of downloads of the software application.

The data capturing apparatus 501 exchanges data with the data storage apparatus 502 via a data interface layer, and the data storage apparatus 501 exchanges data with the anti-cheating analyzing platform 503 via a data interface layer.

In the data storage system, the number of downloads and the comment information may be stored in the form of data sheets.

The above method 5031 for detecting "review fraud" promotion cheating may be referenced to the structure of the apparatus as illustrated in FIG. 7 and the corresponding textual description. The above apparatus 5032 for detecting "download number fraud" promotion cheating may be referenced to the structure of the apparatus as illustrated in FIG. 11 and the corresponding textual description.

In some embodiments, the data interface layer may employ the HIBERNATE ORM framework, and is capable of shielding the bottom-layer database operations and directly storing objects containing data.

Figure 14:
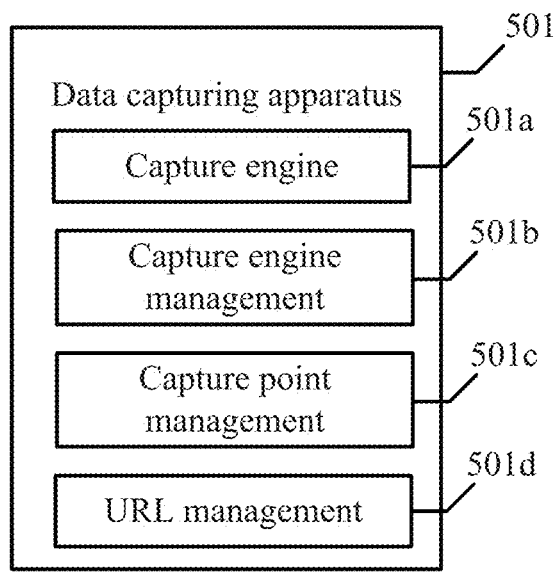
FIG. 14 is a structural diagram illustrating an element in a system for detecting fraudulent software promotion according to some embodiments of the present disclosure.

In one embodiment, the data capturing apparatus 501 may include a capture engine module 501a, a capture engine management module 501b, a capture point management module 501c, and a URL management module 501d, illustrated in FIG. 14.

The URL management module 501d is configured to configure a website prefix to be captured, wherein the website prefix is capable of mapping to the software applications on the whole website to be crawled.

The capture point management module 501c is configured to configure a crawl point of software promotion. Generally for a website, the promoted software application crawling point has a fixed tag position on an HTML page. As such, basic information, for example, a number of downloads, comment information and the like, on the detailed page of a software application may be acquired by using the "Jsoup" tool or another crawling tool.

The capture engine management module 501b is configured to configure an engine state, for example, to configure full-view capture of all the software applications, or to configure hierarchical and selective capture of some software applications, or to configure a capture frequency or the like.

The capture engine module 501a is configured to retrieve a number of downloads and comment information of a software application according to the configurations of the capture engine management module.

In addition, when the apparatus 5031 for detecting "review fraud" promotion cheating and the apparatus 5032 for detecting "download number" promotion cheating acquire a detection result, the detection result may be stored in the data storage system via a data interface layer, for example, the detection result may be stored in a result table. In this way, when a user browses a software application, the corresponding detection result may be directly searched out from the data storage system, such that the user is assisted to identify whether the software application is a promotion cheating software application.

During operation of the system, the data capturing apparatus 501 retrieves comment information and a number of downloads of a software application, and stores the retrieved comment information and number of downloads into the data storage apparatus 502, the anti-cheating analyzing platform 503 acquires corresponding data from the data storage apparatus, for example, acquires a respective corresponding number of downloads and comment information and the like of the software application in the same category on the same website according to the website type and software type. Based on the acquired information, the anti-cheating analyzing platform 503 detects whether a software application is a promotion cheating software application. In addition, the anti-cheating analyzing platform 503 may further store a detection result into the data storage apparatus 502 via the data interface layer, for example, create a result table in the data storage device for storing the detection results. The detection result is capable of indicating whether the software application is a promotion cheating software.

A person skilled in the art would clearly acknowledge that for ease and brevity of description, the specific operation processes of the above described systems, apparatuses and units may be referenced to the relevant portions in the above described method embodiments, which are thus not described herein any further.

In the above embodiments provided in the present disclosure, it should be understood that the disclosed system, apparatus and method may be practiced in other manners. The above described apparatus embodiments are merely illustrative. For example, the unit division is merely a logical function division and there may be other divisions in actual practice. For example, multiple units or components may be combined or integrated into another system, or some features can be ignored or not performed. In addition, the displayed or discussed mutual couplings or direct couplings or communication connections can be practiced through some interfaces. The indirect couplings or communication connections between the apparatuses or units may be practiced in electronic, mechanical or other forms.

The units which are described as separate components may be physically separated or may be not physically separated, and the components which are illustrated as units may be or may not be physical units, that is, the components may be located in the same position or may be distributed into a plurality of network units. A part or all of the units may be selected according to the actual needs to achieve the objectives of the technical solutions of the embodiments.

In addition, various function units according to the embodiments of the present disclosure may be integrated in a processing unit, or may be each independently and physically present; alternatively, two or more than two units may be integrated in a unit. The above integrated unit may be practiced by using hardware, and may also be practiced by using a software function unit.

It should be noted that persons of ordinary skill in the art may understand that all or part of the steps of the methods in the embodiments may be implemented by a program instructing relevant hardware. The program may be stored in a computer readable storage medium. When the program runs, the steps of the methods in the embodiments are performed. The storage medium may be a magnetic disk, a compact disc-read only memory (CD-ROM), a read-only memory (ROM), a random access memory (RAM) or the like.

Although the method, apparatus and system for detecting fraudulent software promotion according to the present disclosure have been described in detail herein, and the principles and embodiments of the present disclosure have been described with reference to specific embodiments and examples, the above embodiments are described only to help understanding of the method and core idea of the present disclosure. Persons of ordinary skill in the art may make modification or variations to the specific embodiments or application scopes according to the inventive concept of the present disclosure. In conclusion, this specification shall not be understood as limiting the present disclosure.

What is claimed is:

1. A method for detecting fraudulent software promotion, the method comprising:
   acquiring, by a server, comment information associated with a software application, the comment information including one or more comments;
   calculating, by the server, an average similarity of the comment information based on a similarity between each comment and one or more previous comments, the calculating the average similarity comprising:
      performing, by the server, word segmentation on the comment information to obtain one or more word segmentation vectors, each of the word segmentation vectors associated with a comment,
      calculating, by the server, maximum similarities for each segmentation vector, a maximum similarity calculated by computing similarities between a selected segmentation vector and previous segmentation vectors and selecting a largest similarity in the similarities, the previous segmentation vectors corresponding to earlier segmentation vectors in an ordered listing of the segmentation vectors, and
      determining, by the server, the average similarity by averaging the maximum similarities;
   defining, by the server, a determination threshold range for a category associated with the software application, wherein the determination threshold range is defined by a plurality of probability statistical distribution parameters based on average similarities of other applications associated with the category; and
   identifying, by the server, the software application as fraudulent if the average similarity of the comment information is within the determination threshold range.

2. The method according to claim 1, wherein defining a determination threshold range comprises:
   calculating, by the server, an expectation and a variance of the average similarities of the other applications associated with the category; and
   determining, by the server, the plurality of probability statistical distribution parameters based on the calculated expectation and variance.

3. The method according to claim 1, wherein defining a determination threshold range comprises:
   identifying, by the server, a probability statistical distribution type based on a data distribution of the average similarities or of the other applications associated with the category; and
   fitting, by the server, distributions based on the probability statistical distribution type to determine the probability statistical distribution parameters of the other applications associated with the category.

4. The method according to claim 3, further comprising:
   identifying, by the server, a normal distribution type based on the data distribution of the average similarity of each of the other applications associated with the category;
   fitting, by the server, distributions based on the normal distribution type to determine the probability statistical distribution parameters of the other applications associated with the category, wherein the distribution parameters include an average value and a standard deviation;

calculating, by the server, a determination threshold range of the other applications associated with the category based on the probability statistical distribution parameters of the other applications associated with the category; and determining, by the server, a threshold range for events based on the determination threshold range.

5. The method of claim 4, wherein determining a threshold range for events based on the determination threshold range further comprises defining the determination threshold range of the other applications associated with the category based on an average value and standard deviation of the probability statistical distribution parameters of the other applications associated with the category.

6. An apparatus for detecting fraudulent software promotion, the apparatus comprising:
a processor; and
a non-transitory memory storing computer-executable instructions therein that, when executed by the processor, cause the apparatus to:
acquire comment information associated with a software application, the comment information including one or more comments;
calculate an average similarity of the comment information based on similarity between each comment and one or more previous comments, the calculating an average similarity comprising:
performing word segmentations on the comment information to obtain one or more word segmentation vectors, each of the word segmentation vectors associated with a comment,
calculating maximum similarities for each segmentation vector, a maximum similarity calculated by computing similarities between a selected segmentation vector and previous segmentation vectors and selecting a largest similarity in the similarities, the previous segmentation vectors corresponding to earlier segmentation vectors in an ordered listing of the segmentation vectors, and
determine the average similarity by averaging the maximum similarities;
define a determination threshold range for the category associated with the software application, wherein the determination threshold range is defined by a plurality of probability statistical distribution parameters based on average similarities of other applications associated with the category; and
identify the software application as fraudulent if the average similarity of the comment information is within the determination threshold range.

7. The apparatus according to claim 6, wherein the instructions causing the apparatus to define a determination threshold range further cause the apparatus to:
calculate an expectation and a variance of the average similarities of the other applications associated with the category; and
determine the plurality of probability statistical distribution parameters based on the calculated expectation and variance.

8. The apparatus according to claim 6, wherein the instructions causing the apparatus to define a determination threshold range further cause the apparatus to:
identify a probability statistical distribution type based on a data distribution of the average similarities of the other applications associated with the category; and fit distributions based on the probability statistical distribution type to determine the probability statistical distribution parameters of the other applications associated with the category.

9. The apparatus according to claim 8, further comprising computer-executable instructions therein that, when executed by the processor, cause the apparatus to:
identify a normal distribution type based on the data distribution of the average similarity of each of the other applications associated with the category;
fit distributions based on the normal distribution type to determine the probability statistical distribution parameters of the other applications associated with the category, wherein the distribution parameters include an average value and a standard deviation; and
calculate a determination threshold range of the other applications associated with the category based on the probability statistical distribution parameters of the other applications associated with the category and determine a threshold range for events based on the determination threshold range.

10. A system for detecting fraudulent software promotion, the system comprising:
a data capturing apparatus configured to retrieve comment information and a number of downloads of a software application, the comment information including one or more comments;
a data storage apparatus configured to receive the comment information and a number of downloads of a software application from the data capturing apparatus and store the comment information and the number of downloads of the software application; and
an anti-cheating analyzing platform configured to:
retrieve the comment information and the number of downloads of the software application from the data storage apparatus;
calculate an average similarity of the comment information based on a similarity between the one or more comments or an average information entropy of the comment information based on an information gain between the one or more comments,
wherein the calculating an average similarity comprises performing word segmentation on the comment information to obtain one or more word segmentation vectors, each of the word segmentation vectors associated with a comment, calculating maximum similarities for each segmentation vector, a maximum similarity calculated by computing similarities between a selected segmentation vector and previous segmentation vectors and selecting a largest similarity in the similarities, the previous segmentation vectors corresponding to earlier segmentation vectors in an ordered listing of the segmentation vectors, and determining an average similarity by averaging the maximum similarities, and
wherein the calculating an average information entropy comprises calculating an information gain of at least one comment with respect to one or more previous comments based on Shannon's theorem, selecting a minimum information gain as an information gain for each of the one or more comments, and determining an average information entropy by averaging the minimum information gain of each of the one or more comments;
calculate a comment-to-download ratio associated with the software application, wherein the comment-to-download ratio is equal to a ratio of a total number of comments to the number of downloads;

define a first determination threshold range for a category associated with the software application, wherein the first determination threshold range is defined by a first plurality of probability statistical distribution parameters based on average similarities or average information entropies of other applications associated with the category;

define a second determination threshold range for the category associated with the software application, wherein the second determination threshold range is defined by a second plurality of probability statistical distribution parameters based on comment-to-download ratios of other applications associated with the category;

determine that the software application is fraudulent if an average similarity or average information entropy of the comment information is within the first determined threshold range; and determine that the software application is fraudulent if a calculated comment-to-download ratio of the software application is within the second determination threshold range.

11. A method for detecting fraudulent software promotion, the method comprising:

acquiring, by a server, comment information associated with a software application, the comment information including one or more comments;

calculating, by the server, an average information entropy of the comment information based on an information gain between each comment and one or more previous comments, the calculating an average information entropy comprising:

calculating, by the server, an information gain of at least one comment with respect to one or more previous comments based on Shannon's theorem;

selecting, by the server, a minimum information gain as an information gain for each of the one or more comments; and determining, by the server, an average information entropy by averaging the minimum information gain of each of the one or more comments;

defining, by the server, a determination threshold range for a category associated with the software application, wherein the determination threshold range is defined by a plurality of probability statistical distribution parameters based on average similarities or average information entropies of other applications associated with the category; and identifying, by the server, the software application as fraudulent if the average information entropy of the comment information is within the determination threshold range.

12. The method according to claim 11, wherein defining a determination threshold range comprises:

calculating, by the server, an expectation and a variance of the average information entropies of the other applications associated with the category; and determining, by the server, the plurality of probability statistical distribution parameters based on the calculated expectation and variance.

13. The method according to claim 11, wherein defining a determination threshold range comprises:

identifying, by the server, a probability statistical distribution type based on a data distribution of the average information entropies of the other applications associated with the category; and fitting, by the server, distributions based on the probability statistical distribution type to determine the probability statistical distribution parameters of the other applications associated with the category.

14. The method according to claim 13, further comprising:

identifying, by the server, a normal distribution type based on the data distribution of the average information entropy of each of the other applications associated with the category;

fitting, by the server, distributions based on the normal distribution type to determine the probability statistical distribution parameters of the other applications associated with the category, wherein the distribution parameters include an average value and a standard deviation;

calculating, by the server, a determination threshold range of the other applications associated with the category based on the probability statistical distribution parameters of the other applications associated with the category; and determining, by the server, a threshold range for events based on the determination threshold range.

15. The method of claim 14, wherein determining a threshold range for events based on the determination threshold range further comprises defining the determination threshold range of the other applications associated with the category based on an average value and standard deviation of the probability statistical distribution parameters of the other applications associated with the category.

16. An apparatus for detecting fraudulent software promotion, the apparatus comprising:

a processor; and a non-transitory memory storing computer-executable instructions therein that, when executed by the processor, cause the apparatus to:

acquire comment information associated with a software application, the comment information including one or more comments;

calculate an average information entropy of the comment information, based on an information gain between each comment and one or more previous comments, the calculating an average information entropy comprising:

calculating an information gain of at least one comment with respect to one or more previous comments based Shannon's theorem, selecting a minimum information gain as an information gain for each of the one or more comments, and determining an average information entropy by averaging the minimum information gain of each of the one or more comments;

define a determination threshold range for the category associated with the software application, wherein the determination threshold range is defined by a plurality of probability statistical distribution parameters based on average information entropies of other applications associated with the category; and identify the software application as fraudulent if the average information entropy of the comment information is within the determination threshold range.

17. The apparatus according to claim 16, wherein the instructions causing the apparatus to define a determination threshold range further cause the apparatus to:

calculate an expectation and a variance of the average information entropies of the other applications associated with the category; and determine the plurality of probability statistical distribution parameters based on the calculated expectation and variance.

18. The apparatus according to claim 16, wherein the instructions causing the apparatus to define a determination threshold range further cause the apparatus to:

identify a probability statistical distribution type based on a data distribution of the average information entropies of the other applications associated with the category; and fit distributions based on the probability statistical distribution type to determine the probability statistical distribution parameters of the other applications associated with the category.

19. The apparatus according to claim 18, further comprising computer-executable instructions therein that, when executed by the processor, cause the apparatus to:

identify a normal distribution type based on the data distribution of the average information entropy of each of the other applications associated with the category;

fit distributions based on the normal distribution type to determine the probability statistical distribution parameters of the other applications associated with the category, wherein the distribution parameters include an average value and a standard deviation; and calculate a determination threshold range of the other applications associated with the category based on the probability statistical distribution parameters of the other applications associated with the category and determine a threshold range for events based on the determination threshold range.

* * * * *